Figure 1:
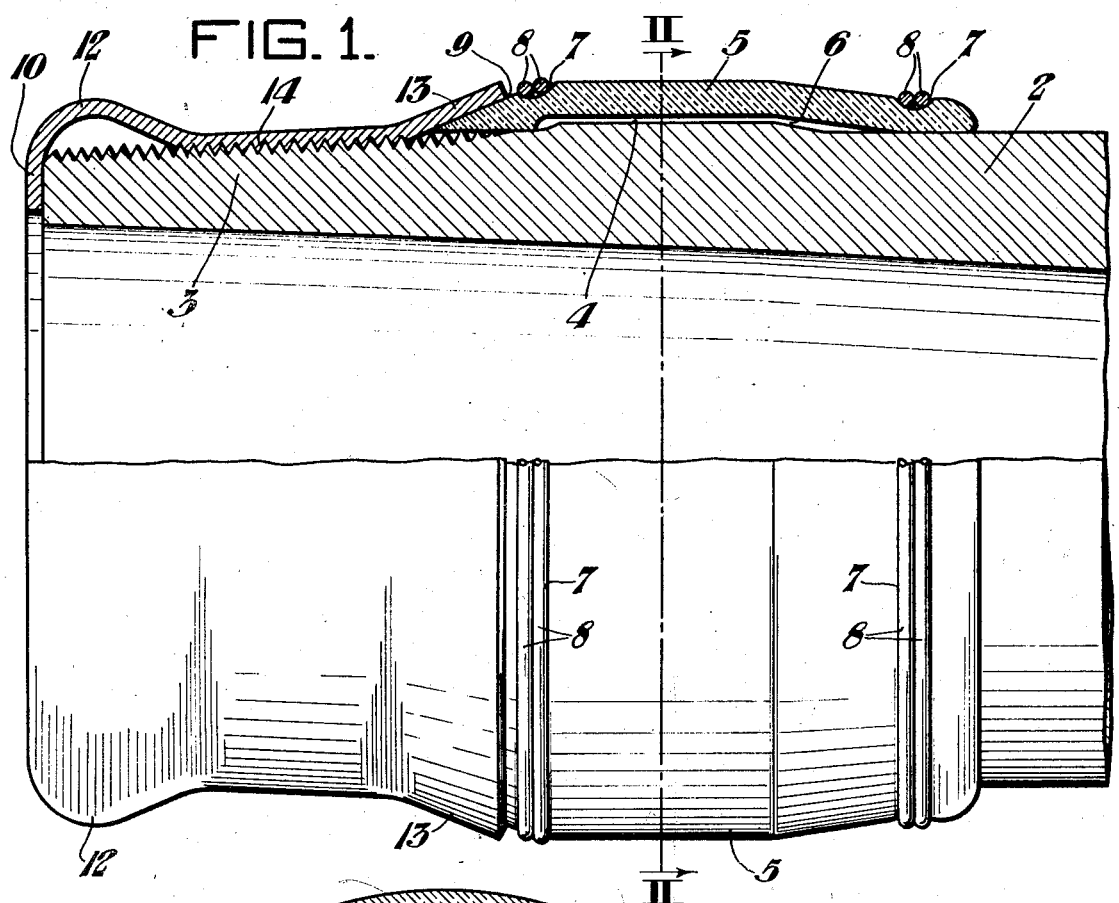

Feb. 11, 1941. W. P. BRADLEY ET AL 2,231,794
MEANS FOR PROTECTING PIPE ENDS
Filed Nov. 23, 1938

Inventors:
William P. Bradley
and Howard M. Hicks.
by: John E. Jackson
their Attorney.

Patented Feb. 11, 1941

2,231,794

UNITED STATES PATENT OFFICE 2,231,794

MEANS FOR PROTECTING PIPE ENDS

William P. Bradley, Crafton, and Howard M. Hicks, McKeesport, Pa., assignors to National Tube Company, a corporation of New Jersey Application November 23, 1938, Serial No. 242,083

4 Claims. (Cl. 138—96)

This invention relates to a means for protecting the ends of pipes and the like, and particularly to an improved means for protecting the threaded portion on the end thereof and a portion immediately thereabove.

In deep well drilling, by the rotary method, it is conventional practice to join the drill pipe together by means of a coupling, known to those in the art as a "tool joint" of the shrink grip type, and consists of a threaded male member and a threaded female member which are adapted to be screwed together and to the ends of the drill pipes. It is the usual practice of the manufacturers of such pipe to supply, to the trade engaged in such drilling, pipe having a machined or polished portion just above the threaded portion on the ends of the length of drill pipes, such machined portions serving as seats for the shrink grip of the "tool joint" during the joining operation.

Such lengths of pipe usually are stored and later shipped to their point of use, and it is desirable to protect the threads and the machined portion thereon from corrosion during the interim between the time of their finished manufacture and the time of their use, and also from damage that might occur during the handling and shipping thereof; and it is to such means for protecting these portions that the present invention refers.

It is one of the objects of the present invention to provide an improved means for protecting the ends of pipes which is simple and inexpensive and, at the same time, practical, efficient and satisfactory in its use.

It is another object of this invention to provide an improved means for protecting the ends of pipes which will not only protect the ends thereof from corrosion but will also protect the same from damage that might incur from the handling and shipping thereof.

It is still another object of this invention to provide an improved means for protecting machined portions on the ends of pipes from corrosion by providing a means for keeping the same lubricated during the interim between the time of manufacture of the pipe and the time of use thereof.

Various other objects and advantages of this invention will be more apparent in the course of the following specification and will be particularly pointed out in the appended claims.

In the accompanying drawing, there is shown, for the purpose of illustration, one embodiment which our invention may assume in practice.

Figure 2:
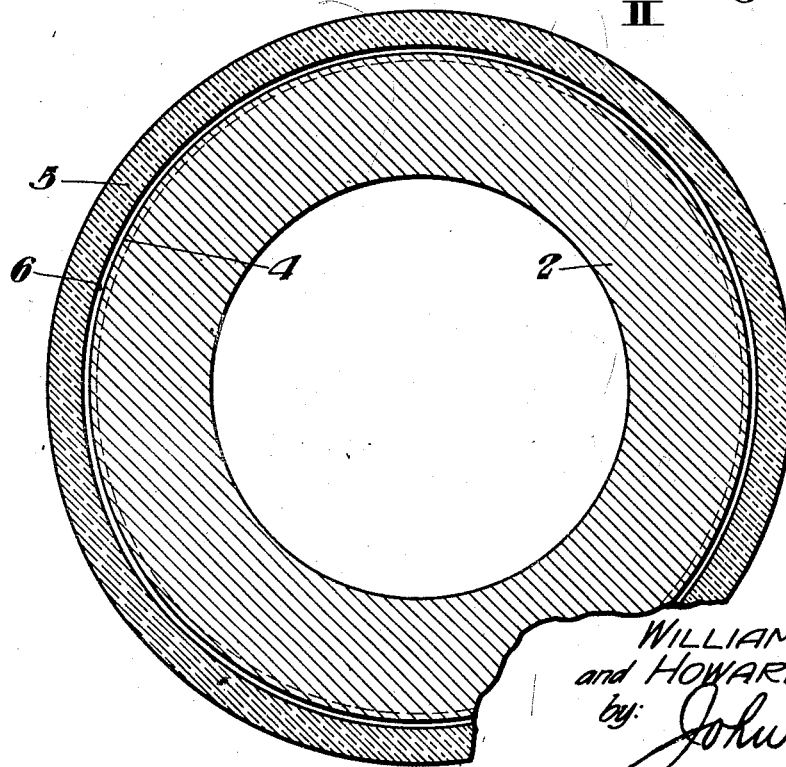

In the drawing:

Figure 1 is a plan, partly in section, of the improved means of our invention for protecting pipe ends showing it in position on the end of a pipe; and, Fig. 2 is a section taken on the line II—II of Figure 1.

Referring more particularly to the drawing, there is shown a cylindrical drill pipe 2 having a threaded portion 3 on the outer end thereof with a machined portion 4 arranged immediately thereabove for the purpose of serving as a seat for the shrink grip of a tool joint.

The improved means of our invention for protecting the threaded end portion and the machined portion comprises a flexible member 5, preferably made of rubber or any other suitable material, annularly arranged around the machined portion 4 of the pipe. The inner wall of the flexible member 5 is so arranged that it is spaced from this machined portion when it is positioned around the same so as to provide a housing 6 for a lubricant, such as grease and the like. There is arranged around the outer periphery of the flexible member 5 a pair of grooves 7 which are adapted to act as seats for tie-wires 8, with the outer edge of the flexible member being relieved or tapered, as at 9.

There is arranged over the outer end and threaded portion 3 of the pipe preferably a metallic cap 10 having an enlarged outer end portion 12 with the inner edge thereof flared outwardly, as at 13, to conform to the tapered portion 9 of the flexible member 5. The cap 10 is internally grooved or threaded, as at 14, so as to conform to the external threads of the pipe 2.

In assembling the protecting means of our invention on the end of a pipe, as shown, there is first placed a suitable quantity of lubricant, such as grease, on the inside of the flexible member 5. The flexible member is then annularly arranged around the machined portion 4 of the pipe and the tie-wires 8 positioned therearound so as to securely hold the flexible member in position opposite the machined portion, thereby preventing slippage of the same and preventing the escape of the lubricant from thereunder. It will be seen that, when the flexible member 5 is placed around the machined portion, the lubricant carried thereby will come in contact with the machined portion, thereby preventing the same from corroding. The cap 10 is then placed over the end of the pipe and screwed thereon until the outwardly flared edge 13 thereof overlaps the outer tapered portion of the flexible member 5. It will be understood that the cap 10 is screwed on tightly and the flared end 13, in moving over the tapered portion 9 of the flexible member, tends to compress this portion of the flexible member, thereby sealing the outer end of the flexible member to prevent any moisture from entering thereunder and aiding in holding it in position opposite the machined portion.

As a result of our invention, it will be seen that there is provided an inexpensive and effective means for protecting the ends of pipes which can be easily and quickly applied and, at the same time, conveniently removed therefrom when it is desired to put the pipe into use. It will also be seen that our improved protecting means not only protects the ends of pipes from corrosion but also protects them from damage to which they may be subjected during the handling and shipment thereof.

While we have shown and described one embodiment of our invention, it will be understood that this embodiment is merely for the purpose of illustration and description and that various other forms may be devised within the scope of our invention, as defined in the appended claims.

We claim:

1. Means for protecting the external threaded portion on the end of a pipe and a machined portion immediately thereabove including, in combination, an annular member adapted to be arranged around said machined portion having the central portion thereof spaced from said machined portion for the purpose of housing a lubricant, means for holding said member in position thereon, and means adapted to be arranged over the end and threaded portion of the pipe to protect the same, said last mentioned means overlapping at least the outer end portion of said annular member.

2. Means for protecting the external threaded portion on the end of a pipe and a machined portion immediately thereabove including, in combination, a rubber pliable annular member adapted to be arranged around said machined portion, means arranged around said pliable member for holding the same in position thereon, means arranged within said pliable member for lubricating said machined portion, and a metallic cap adapted to be arranged over the end and threaded portion of the pipe with the inner end thereof having a slightly larger inner diameter than the outer diameter of the outer end of said annular member whereby the same overlaps the outer edge of said pliable member to aid in holding the same in position on the pipe.

3. Means for protecting the external threaded portion on the end of a pipe and a machined portion immediately thereabove including, in combination, a rubber pliable annular member adapted to be arranged around said machined portion having the central portion thereof spaced therefrom so as to provide a housing for a lubricant for keeping said machined portion lubricated, means for holding said pliable member securely in position thereon, and an internally threaded metallic cap adapted to be arranged over the end and threaded portion of said pipe to protect the same, said cap having an outwardly flared end portion which is adapted to overlap the outer edge of the pliable annular member when said cap is screwed to position thereon.

4. Means for protecting the external threaded portion on the end of a pipe and a machined portion immediately thereabove including, in combination, a rubber pliable annular member adapted to be arranged around said machined portion, said pliable member having an outwardly tapered portion arranged on the outer end thereof and having the central portion thereof constructed and arranged so as to be spaced from the machined portion whereby a housing portion is provided thereunder, a lubricant adapted to be disposed in said housing portion between said annular pliable member and the machined portion on said pipe, means arranged around said pliable member for holding the same securely in position around the pipe, and an internally threaded metallic cap member adapted to be arranged over the end and threaded portion of said pipe to protect the same, said cap having an outwardly flared portion arranged on the inner end thereof which is adapted to overlap the outer tapered portion of said pliable member compressing the same when the cap is placed on the end of the pipe and screwed to position thereon so as to prevent any moisture from entering thereunder.

WILLIAM P. BRADLEY.
HOWARD M. HICKS.